US011829949B2

(12) United States Patent
Punzalan et al.

(10) Patent No.: US 11,829,949 B2
(45) Date of Patent: Nov. 28, 2023

(54) PAY STATEMENT SETUP

(71) Applicant: ADP, Inc., Roseland, NJ (US)

(72) Inventors: Roel Punzalan, Pasadena, CA (US); Chris Montes, Pasadena, CA (US)

(73) Assignee: ADP, Inc., Roseland, NJ (US)

( * ) Notice: Subject to any disclaimer, the term of this patent is extended or adjusted under 35 U.S.C. 154(b) by 25 days.

(21) Appl. No.: 16/894,105

(22) Filed: Jun. 5, 2020

(65) Prior Publication Data

US 2021/0383326 A1 Dec. 9, 2021

(51) Int. Cl.
*G06Q 10/10* (2023.01)
*G06Q 40/12* (2023.01)
*G06F 3/0482* (2013.01)

(52) U.S. Cl.
CPC .......... *G06Q 10/10* (2013.01); *G06Q 40/125* (2013.12); *G06F 3/0482* (2013.01)

(58) Field of Classification Search
CPC ..... G06Q 10/10; G06Q 40/125; G06F 3/0482
See application file for complete search history.

(56) References Cited

U.S. PATENT DOCUMENTS

| | | | | |
|---|---|---|---|---|
| 2003/0004874 | A1* | 1/2003 | Ludwig | G06Q 20/102 |
| | | | | 705/40 |
| 2006/0009880 | A1* | 1/2006 | Bahel | G05B 19/0426 |
| | | | | 703/9 |
| 2009/0043689 | A1* | 2/2009 | Yang | G06Q 30/04 |
| | | | | 705/38 |
| 2020/0013098 | A1* | 1/2020 | Schnitt | G06F 40/258 |
| 2020/0118057 | A1* | 4/2020 | Fallis | G06Q 10/1091 |
| 2020/0174800 | A1* | 6/2020 | Berlitz | G06F 8/34 |
| 2021/0124462 | A1* | 4/2021 | Vakil | G06F 3/0484 |

FOREIGN PATENT DOCUMENTS

| | | | | |
|---|---|---|---|---|
| CA | 2570897 | A1 * | 2/2006 | G06Q 50/08 |
| CA | 2396266 | C * | 3/2007 | G06Q 20/04 |

OTHER PUBLICATIONS

Ling-Hua Chang, W-Revised: An amazing tool for creating customized websites, Nov. 1, 2014, The 2014 2nd International Conference on Systems and Informatics (ICSAI 2014), pp. 465-470 (Year: 2014).*

* cited by examiner

*Primary Examiner* — Allen C Chein
*Assistant Examiner* — Aaron N Tutor
(74) *Attorney, Agent, or Firm* — Foley & Lardner LLP (57) ABSTRACT

A computer-implemented method, system, and computer program product for configuring a pay statement. An input area is presented for a user to enter settings defining how the pay statement is to be configured. The settings are received from the user. A preview of the pay statement is displayed in a preview area based on the settings. The preview provides a visual representation of how the pay statement will appear for the settings. The user may modify the settings until the preview appears as desired by the user.

18 Claims, 9 Drawing Sheets

ADP SmartCompliance™

CHECKPOINT | HOME   SERVICES   SCORECARDS

< back
Product Configuration
Pay Statement  Now let's configure your pay statement from an ADP template, which is compliant for all jurisdictions.

Client Profile:
0/2 Tasks Completed   Progress

Submit your company logo(s) to place on  406
checks and pay statements if you'd like.

Drop your logo files here, or SELECT FILES
Must be 300 dpi, no less than 2 inches,
and in JPEG or PNG format.

408

Are you providing ADP with Third
Party Sick Pay information?
○ Yes  ○ No

Do you want to suppress Zero
Net and Zero Gross payments?
○ Yes  ○ No

Display the following on the pay statement:
☑ Company Phone        ☑ Cost Center in
☑ Exclude Message          Address Window
☑ Pay Basis            ☑ Federal Taxable
☑ Payee Address        ☑ Pay Rate
☑ Total Hours          ☑ Standard Header What is your          What is your
iPay Code?            IVR Code?

Business Identification Number for
display on pay statements in Oregon

Pay Statement Preview

Sample Company Name
Sample Company Address              Earning Statement
Sample Company Address Line2        Check Number : #3456

Employee Details

Income | Year To Date | Deductions | YTD Total

Current Pay | YTD Gross | Deductions | YTD Deductions

YTD Net Pay  $5,017.28   Net Pay  $313.58

402  ADP needs signatures for the checks you
are funding from your own bank accounts.    ⬆ Download Signature File   404
One-Signature Check   Two-Signature Check

410
Drop your signature file here, or  (or)   ✉ REQUEST FROM OFFICER
SELECT FILE                Officer will be able to provide their e-signature to ADP directly.
Must be in JPEG or PNG format.  Printed Name ___________
                                Extra Text Under Signature Line ___________

SAVE AND CLOSE

ADP SmartCompliance™

CHECKPOINT | HOME   SERVICES   SCORECARDS

< back
Product Configuration
Pay Statement
Now let's configure your pay statement from an ADP template, which is compliant for all jurisdictions.

Client Profile:
0/2 Tasks Completed — Progress

Submit your company logo(s) to place on checks and pay statements if you'd like.

```
Drop your logo files here, or SELECT FILES
Must be 300 dpi, no less than 2 inches,
and in JPEG or PNG format.
```
506   508

Are you providing ADP with Third Party Sick Pay information? ⓘ
○ Yes  ○ No

Do you want to suppress Zero Net and Zero Gross payments? ⓘ
○ Yes  ○ No

Display the following on the pay statement:
☑ Company Phone      ☑ Cost Center in
☑ Exclude Message        Address Window
☑ Pay Basis          ☑ Federal Taxable
☑ Payee Address      ☑ Pay Rate
☑ Total Hours        ☑ Standard Header What is your          What is your        ⓘ
iPay Code?            IVR Code?

Business Identification Number for  ⓘ
display on pay statements in Oregon

502

Pay Statement Preview ⓘ

Sample Company Name
Sample Company Address            Earning Statement
Sample Company Address Line2      Check Number : #3456

Employee Details

| Income | Year To Date | Deductions | YTD Total |

| Current Pay | YTD Gross | Deductions | YTD Deductions |

| YTD Net Pay | $5,017.28 | Net Pay | $313.58 |

SAVE AND CLOSE    504

FIG. 6

ADP SmartCompliance™

CHECKPOINT | HOME   SERVICES   SCORECARDS

< back
Product Configuration
Pay Statement
Now let's configure your pay statement from an ADP template, which is compliant for all jurisdictions.

Client Profile:
0/2 Tasks Completed  Progress

Submit your company logo(s) to place on checks and pay statements if you'd like.

LASSENS NATURAL FOODS & VITAMINS — 606  🗑 DELETE

⊕ ADD ANOTHER LOGO — 610

608

Are you providing ADP with Third Party Sick Pay information? ⓘ
○ Yes  ○ No

Do you want to suppress Zero Net and Zero Gross payments? ⓘ
○ Yes  ○ No

Display the following on the pay statement:
☑ Company Phone      ☑ Cost Center in Address Window
☑ Exclude Message
☑ Pay Basis          ☑ Federal Taxable
☑ Payee Address      ☑ Pay Rate
☑ Total Hours        ☑ Standard Header What is your iPay Code?    What is your IVR Code? ⓘ
_____________            _____________

Business Identification Number for display on pay statements in Oregon ⓘ
_____________

602

Pay Statement Preview ⓘ

LASSENS
NATURAL FOODS & VITAMINS
Sample Company Address           Earning Statement
Sample Company Address Line2     Check Number : #3456

Employee Details

| Income | Year To Date | Deductions | YTD Total |

| Current Pay | YTD Gross | Deductions | YTD Deductions |

| YTD Net Pay | $5,017.28 | Net Pay | $313.58 |

SAVE AND CLOSE       604  ⚡ 💬

ADP SmartCompliance™

CHECKPOINT | HOME    SERVICES    SCORECARDS

< back
Product Configuration
Pay Statement
Now let's configure your pay statement from an ADP template, which is compliant for all jurisdictions.

Client Profile:
0/2 Tasks Completed — Progress

Submit your company logo(s) to place on checks and pay statements if you'd like.

LASSENS NATURAL FOODS & VITAMINS — 606   🗑 DELETE

⊙ Drop your logo files here, or SELECT FILES
Must be 300 dpi, no less than 2 inches, and in JPEG or PNG format.

710   608

Are you providing ADP with Third ⓘ
Party Sick Pay information?
○ Yes   ○ No

Do you want to suppress Zero ⓘ
Net and Zero Gross payments?
○ Yes   ○ No

Display the following on the pay statement:
☑ Company Phone        ☑ Cost Center in
☑ Exclude Message           Address Window
☑ Pay Basis            ☑ Federal Taxable
☑ Payee Address        ☑ Pay Rate
☑ Total Hours          ☑ Standard Header What is your            What is your       ⓘ
iPay Code?              IVR Code?

_____________           _____________

Business Identification Number for   ⓘ
display on pay statements in Oregon

602

Pay Statement Preview ⓘ

LASSENS NATURAL FOODS & VITAMINS
Sample Company Address          Earning Statement
Sample Company Address Line2    Check Number : #3456

Employee Details

| Income | Year To Date | Deductions | YTD Total |

| Current Pay | YTD Gross | Deductions | YTD Deductions |

| YTD Net Pay | $5,017.28 | Net Pay | $313.58 |

SAVE AND CLOSE

ADP SmartCompliance™

CHECKPOINT | HOME  SERVICES  SCORECARDS

< back
Product Configuration
Pay Statement
Now let's configure your pay statement from an ADP template, which is compliant for all jurisdictions.

Client Profile:
0/2 Tasks Completed — Progress

---

Submit your company logo(s) to place on checks and pay statements if you'd like.

[LASSENS NATURAL FOODS & VITAMINS] — 606  🗑 DELETE

[LASSENS NATURAL FOODS & VITAMINS] — 810  🗑 DELETE

⊕ ADD ANOTHER LOGO — 812

608

Are you providing ADP with Third Party Sick Pay information? ⓘ
○ Yes   ○ No

Do you want to suppress Zero Net and Zero Gross payments? ⓘ
○ Yes   ○ No

Display the following on the pay statement:
☑ Company Phone          ☑ Cost Center in
☑ Exclude Message            Address Window
☑ Pay Basis              ☑ Federal Taxable
☑ Payee Address          ☑ Pay Rate
☑ Total Hours            ☑ Standard Header What is your          What is your       ⓘ
iPay Code?            IVR Code?
_______________       _______________

Business Identification Number for    ⓘ
display on pay statements in Oregon
_______________

602

Pay Statement Preview ⓘ

LASSENS
NATURAL FOODS & VITAMINS

Sample Company Address          Earning Statement
Sample Company Address Line2    Check Number : #3456

Employee Details

| Income | Year To Date | Deductions | YTD Total |

| Current Pay | YTD Gross | Deductions | YTD Deductions |

| YTD Net Pay | $5,017.28 | Net Pay | $313.58 |

SAVE AND CLOSE          604

FIG. 9

PAY STATEMENT SETUP

BACKGROUND INFORMATION

1. Field

The present disclosure relates generally to an improved computer system and, in particular, to a system and process for configuring a pay statement. More particularly, the present disclosure relates to providing a user with a visualization of a pay statement contemporaneously with selection of various configurable parameters of the pay statement.

2. Background

Many enterprises utilize outside entities to provide their payroll services. By offloading payroll, an enterprise is free to concentrate on its core business. However, one downside of offloading payroll responsibilities to an outside service is increased difficulty in setting up and configuring a pay statement for the enterprise. Numerous back and forth exchanges of information between the enterprise and the outside entity may be needed in order to set up and configure a pay statement that is acceptable to the enterprise. This back and forth exchange consumes enterprise resources and increases the time needed to finalize a pay statement configuration that is ready to use. Therefore, an improved method for configuring a pay statement with an outside entity is desirable.

SUMMARY

An illustrative embodiment provides a computer-implemented method for configuring a pay statement. The method includes presenting, by a computer, an input area for a user to enter settings defining how the pay statement is to be configured. The settings are received from the user by the computer. The computer displays a preview of the pay statement in a preview area based on the settings. The preview provides a visual representation of how the pay statement will appear for the settings.

Another illustrative embodiment provides a computer system for configuring a pay statement. The computer system includes a processor unit that is configured to: present an input area for a user to enter settings defining how the pay statement is to be configured, receive the settings from the user, and display a preview of the pay statement in a preview area based on the settings. The preview provides a visual representation of how the pay statement will appear for the settings.

Yet another illustrative embodiment provides a computer program product for configuring a pay statement. The computer program product includes a computer readable storage media having program instructions embodied therewith. The program instructions are executable by a computer to cause the computer to: present an input area for a user to enter settings defining how the pay statement is to be configured, receive the settings from the user, and display a preview of the pay statement in a preview area based on the settings. The preview provides a visual representation of how the pay statement will appear for the settings.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently a client of an outside payroll service provider does not see their pay statement until the very end of an onboarding process. The illustrative embodiments further recognize and take into account that the onboarding process involves configuring a pay statement using manually entered requirements in a spreadsheet with no visual feedback provided. The illustrative embodiments further recognize and take into account that, in the current manual process, configuring the pay statement involves a process of manual data being sent back-and-forth repeatedly between the client and the payroll service provider to set up the pay statement correctly. Thus, the illustrative embodiments further recognize and take into account that there is a need for a more real-time, visual pay statement configurator.

The illustrative embodiments provide methods, systems, and computer program products that provide a pay statement configurator. In illustrative embodiments, the pay statement configurator includes an interface that has two main parts.

One side of the interface includes an input area for entering settings that define how the pay statement will be configured. In an illustrative embodiment, a user can upload one or more company logos to place on the pay statement, if desired. The user can also specify pay statement attributes and can add or remove line items in the pay statement.

On the other side of the interface, a preview of the pay statement that is being configuring is displayed. The preview reflects the settings that are specified in the input area along with placeholder example data to provide a preview of the pay statement that looks as real as possible.

Furthermore, in illustrative embodiments, the pay statement configurator has different versions according to user needs. For example, if a user entity has their own bank that is used to provide funding for wages, the configurator will include a place to provide an executive signature for display on the pay statement. In an illustrative embodiment, only options for settings that apply to the specific user are shown in the pay statement configurator.

Illustrative embodiments may be a system, a method, and/or a computer program product at any possible technical detail level of integration. The computer program product may include computer readable storage media having computer readable program instructions thereon for causing a processor to carry out aspects of the illustrative embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of illustrative embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the illustrative embodiments.

Aspects of the illustrative embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various illustrative embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
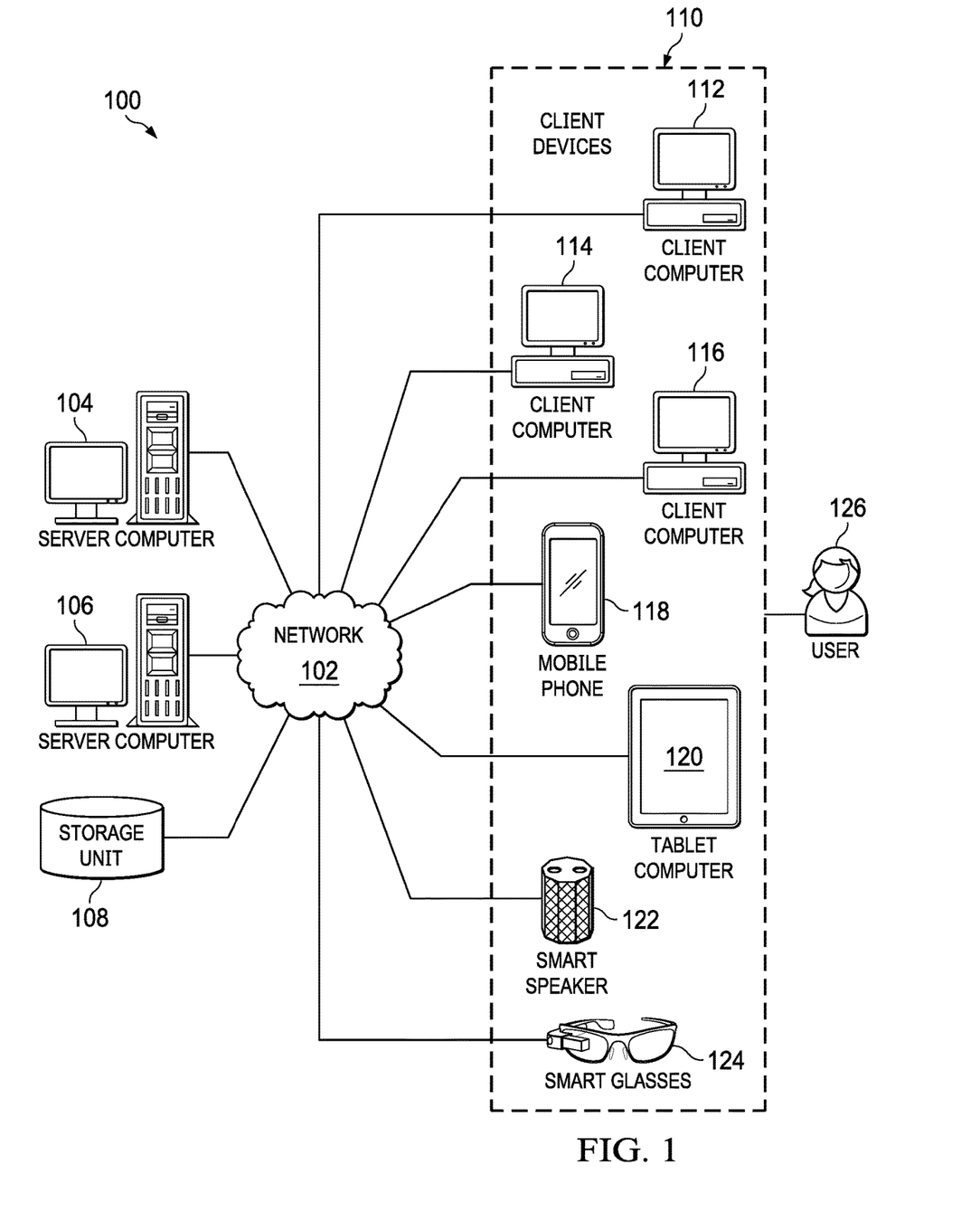
FIG. 1 is a block diagram of an information environment in accordance with an illustrative embodiment.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Further, client devices 110 can also include other types of client devices such as mobile phone 118, tablet computer 120, smart speaker 122, and smart glasses 124. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of an Internet-of-Things (IoT). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
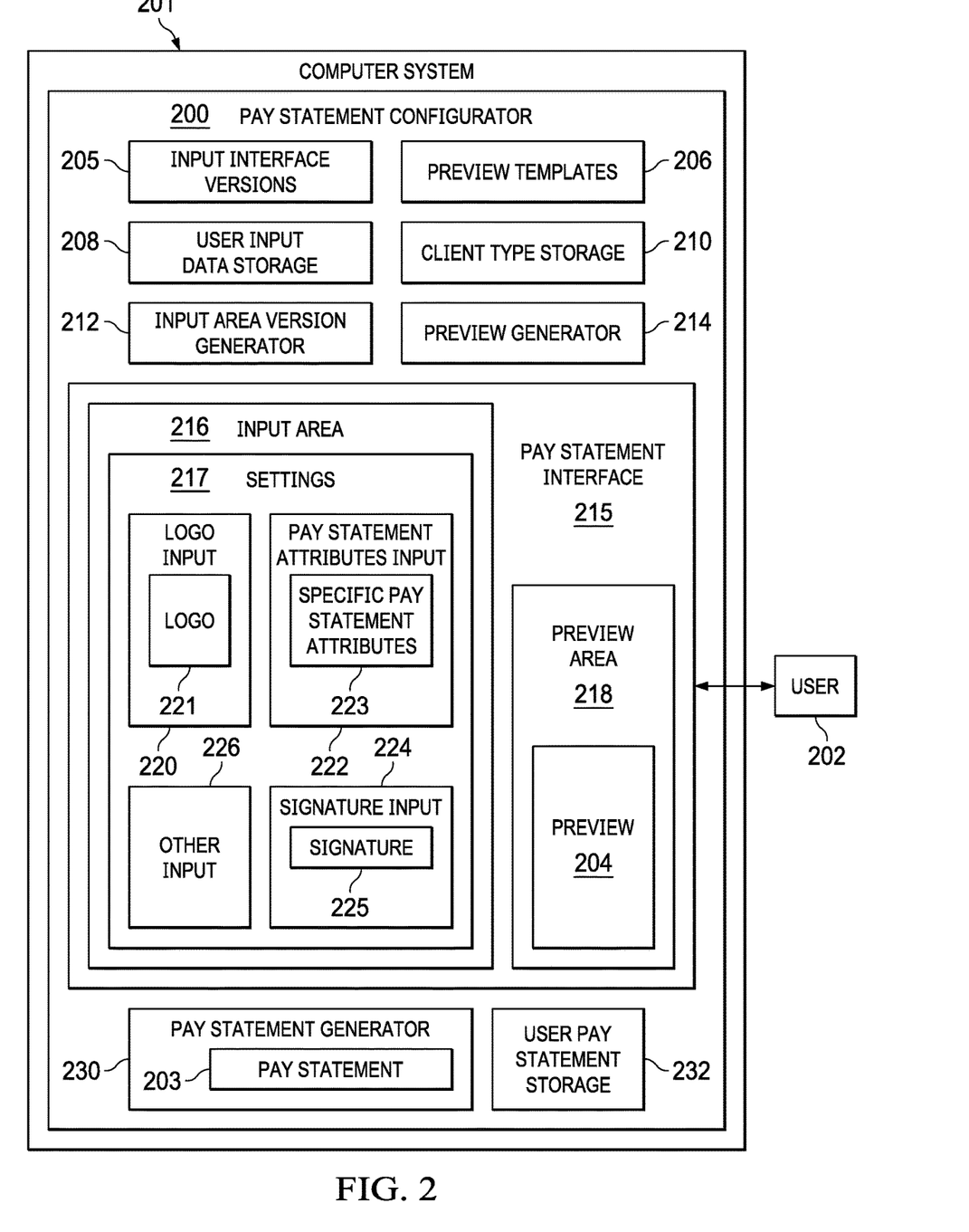
FIG. 2 is a block diagram of a system for configuring a pay statement depicted in accordance with an illustrative embodiment.

Turning now to FIG. 2, a block diagram of a pay statement configurator for configuring a pay statement is depicted in accordance with an illustrative embodiment. Pay statement configurator 200 is implemented in computer system 201.

Pay statement configurator 200 can be implemented in software, hardware, firmware or a combination thereof. When software is used, the operations performed by pay statement configurator 200 can be implemented in program code configured to run on hardware, such as a processor unit. When firmware is used, the operations performed by pay statement configurator 200 can be implemented in program code and data and stored in persistent memory to run on a processor unit. When hardware is employed, the hardware may include circuits that operate to perform the operations in pay statement configurator 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As depicted, computer system 201 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

Network data processing system 100 in FIG. 1 illustrates data processing systems that may be used in computer system 201. In some illustrative embodiments, pay statement configurator 200 may be a web-based or cloud-based system in computer system 201.

Pay statement configurator 200 allows a user 202 to interactively configure a pay statement 203. For example, without limitation, user 202 may be a representative of an entity that is a client of an outside payroll service provider. In this case, the outside payroll service provider may provide pay statement configurator 200 for use by the client entity to configure the pay statement 203 in an effective and efficient manner. In accordance with an illustrative embodiment, pay statement configurator 200 provides an accurate preview 204 of the pay statement 203 as the pay statement 203 is being configured by the user 202.

Pay statement configurator 200 includes input interface versions 205, preview templates 206, user input data storage 208, client type storage 210, input area version generator 212, preview generator 214, pay statement interface 215, pay statement generator 230, and user pay statement storage 232. Pay statement interface 215 includes input area 216 and preview area 218.

Input interface versions 205 stores various versions of the input area 216 of the pay statement interface 215 such that the input area 216, in some embodiments, may be customized to present only input selections appropriate for the particular client. Thus, the input area 216 is customized and thus streamlined to reduce clutter and provide the user with a better experience, since the user will be less likely to be confused by the presence of input selections that are not pertinent to that user.

Preview templates 206 contains a plurality of templates that may be used to generate a pay statement for display in preview area 218 and for the actual pay statement 203 ultimately customized and selected by the user 202. Different templates may be appropriate for different jurisdictions and/or different customer types. The plurality of preview templates 206 preferably are fully-compliant with the requirements of various types of agencies, jurisdictions, compliance laws, and the like.

User input data storage 208 stores the data that the user 202 inputs in input area 216. The data stored in user input data storage 208 is used by the preview generator 214 to generate the pay statement preview 204 displayed in preview area 218. The data stored in user input data storage 208 also is used by the pay statement generator 230 to generate the pay statement 203 ultimately customized by the user 202.

Client type storage 210 stores the client type for each customer using the pay statement configurator 200. Input area version generator 212 uses the client type of the client obtained from client type storage 210 to select an appropriate input interface version from input interface versions 204 to generate the input area 216 in pay statement interface 215.

Preview generator 214 selects an appropriate pay statement template from preview templates 206 based on, for example, the client type and/or inputs received from the user in the input area 216.

The input area 216 allows a user 202 to enter a number of settings 217 to customize the pay statement 203. For example, without limitation, the input area 216 may include logo input 220, pay statement attributes input 222, signature input 224, and other input 226. The logo input 220 is configured to allow the user 202 to input a logo 221 of a company or other graphical element to be included on the pay statement 203. The pay statement attributes input 222 is configured to allow the user 202 to define specific pay statement attributes 223. For example, pay statement attributes input 222 may be configured to allow the user 202 to select or otherwise input specific pay statement attributes 223 that define one or more of: the data or type of data that is to be included in the pay statement 203, the locations on the pay statement 203 at which the specified data or type of data is to be presented, and the format in which the data is to be presented on the pay statement 203. The signature input 224 is configured to allow the user 202 to define a signature 225 to appear on the pay statement 203. For example, the signature 225 may be the signature of an authorized executive for an entity that uses its own bank to fund payroll. Other input 226 may be configured to allow the user 202 to enter or select any other appropriate settings 217 for defining how pay statement 203 is to be configured.

Preview area 218 is generated by preview generator 214 and displays the preview 204 of the pay statement 203 as it would appear based on the current input by user 202 in input area 216, but using mock or placeholder data within the real or actual display configuration. In other words, the way that the data is displayed in preview 204 is the same way that data will be presented in the real pay statement 203, but the data being previewed is appropriate example data. This preview 204 allows the user 202 to quickly see whether the pay statement 203 being configured looks like the way the user desires and if all of the pertinent information is displayed appropriately. If the pay statement preview 204 displayed in the preview area 218 is unsatisfactory to the user 202, the user 202 may change the selections in input area 216 to produce a different pay statement preview 204. The user 202 may modify various parameters selectable in input area 216 until the pay statement preview 204 satisfies the user 202. Once the user 202 is satisfied, the pay statement generator 230 generates a user pay statement template to be used for the user's pay statement 203 and stores the template in user pay statement storage 232.

The illustration of pay statement configurator 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
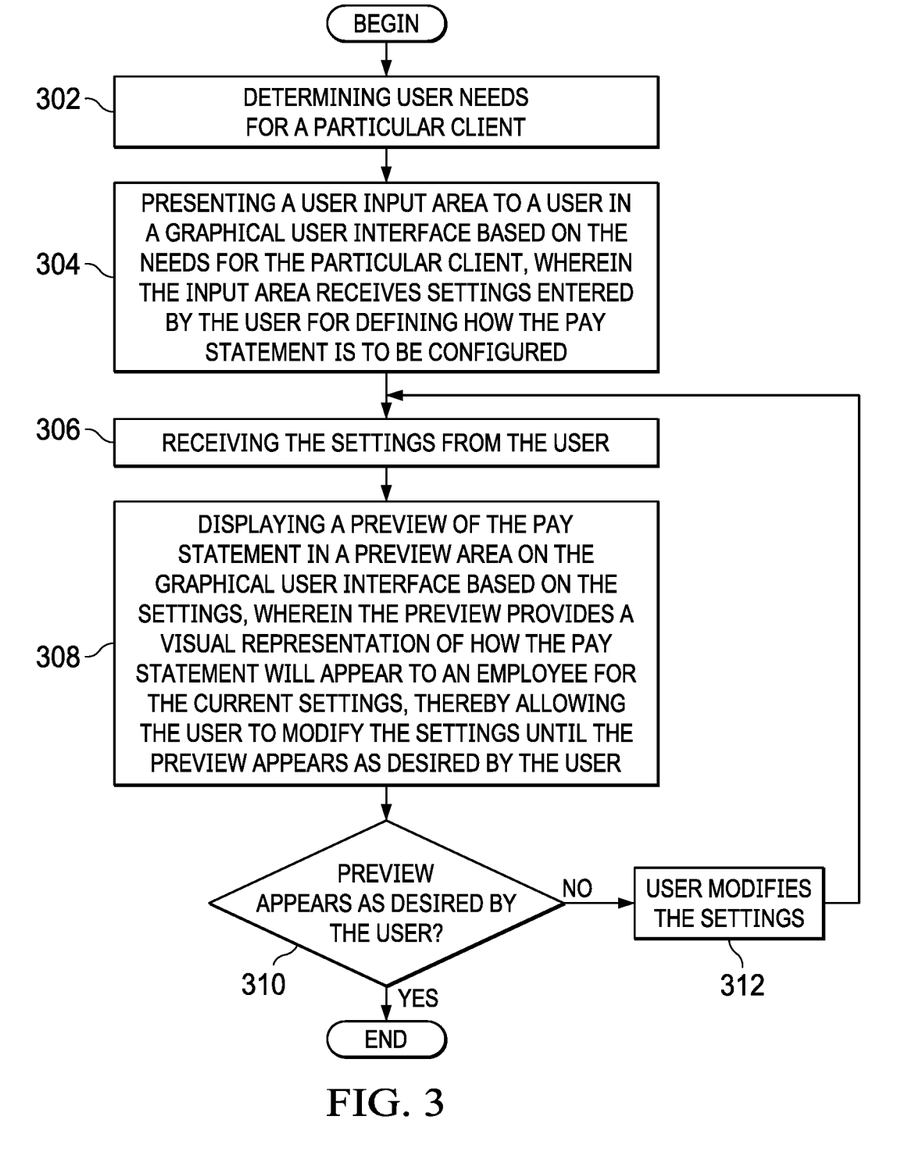
FIG. 3 is a flowchart of a method for configuring a pay statement depicted in accordance with an illustrative embodiment.

Turning now to FIG. 3, a flowchart of a method for configuring a pay statement is depicted in accordance with an illustrative embodiment. Method 300 may be implemented, for example, in pay statement configurator 200 in FIG. 2.

The method 300 begins by determining user needs for a particular client (step 302). Different types of clients may require different information on their pay statements. Information that is needed for one type of client may not be needed for a different type of client. Thus, by determining the type of client, the configurator avoids requesting input for settings that are not needed by a particular client and ensures that information that is needed is requested. For example, if the client has its own bank(s) to use to provide funding for their company wages, the configurator will include a place to provide an executive signature for display on the check and pay statement. In another embodiment, for clients that use the payroll provider's bank, this information is not needed and the input area of the configurator will not have a section for input of this information.

Next, the method 300 continues by presenting a user input area to a user in a graphical user interface based on the needs for the particular client, wherein the input area is configured to receive settings entered by the user for defining how the pay statement is to be configured (step 304). As discussed above, the input area may include various setting options that correspond to the user needs. Thus, setting options that are not required for the particular client type are not presented to the user. In other words, the setting options presented to the user do not include options not needed by the user.

Next, the method 300 continues by receiving the settings from the user (step 306). For example, the settings received from the user may include a logo for a company or other entity for which the user is configuring the pay statement. As another example, the settings received from the user may include specific pay statement attributes. The specific pay statement attributes may define one or more of: the data or type of data that is to be included in the pay statement, the locations on the pay statement at which the specified data or type of data is to be presented, and the format in which the data is to be presented on the pay statement. The data that is to be included in the pay statement, as defined by the specific pay statement attributes, may include various pay related data and other appropriate data. For example, without limitation, the data to be included in the pay statement may include one or more of: gross pay, net pay, withholdings, employee name, employee social security number, other employee identification number, employee address, employer name, employer tax payer identification number, other employer identification number, employer address, other employee or employer information related to employee pay, other appropriate information, and any appropriate combination of information. The locations on the pay statement at which specified data is to be presented, as defined by the specific pay statement attributes, may include specifically identified areas of the pay statement in which specified data is presented. The format in which the data is to be presented on the pay statement, as defined by the specific pay statement attributes, may include any appropriate definition of any appropriate way in which specified data is presented at a specified location on the pay statement. For example, without limitation, the specific pay statement attributes received from the user may specify that employee pay is presented in the pay statement for the current pay period, for the current month, and for the current year. As another example, if an employer does not offer a retirement plan, the specific pay statement attributes received from the user may specify that a section for retirement information is not included in the pay statement. The settings received from the user may also include adding or removing a line item from the pay statement.

Next, the method 300 proceeds by displaying a preview of the pay statement in a preview area on the graphical user interface based on the settings (step 308). The preview provides a visual representation of how the pay statement will appear to an employee for the current settings. In an illustrative embodiment, the preview reflects the settings that the user is specifying along with placeholder example data so that the statement looks as "real" as possible. Thereby allowing the user to modify the settings until the preview appears as desired by the user.

The method 300 proceeds by determining whether the preview appears as desired by the user (step 310). If the preview does appear as desired, the method terminates. If the preview does not appear as desired, the user may modify the settings (step 312), with the method then returning to step 306 wherein the modified settings are received for then displaying a modified preview of the pay statement in the preview area based on the modified settings. In an illustrative embodiment, the modified preview may include placeholder example data, such as gross pay, withholding, etc. to provide the user with a realistic looking preview. Steps 306-312 may be repeated as often as necessary until the user is satisfied with the appearance of the pay statement in the preview.

The method 300 provides an advantage over prior art methods of configuring a pay statement in that a user may configure a pay statement quickly using an interface that allows easy input and provides a preview contemporaneous with the input of the data. Illustrative embodiments thus provide the user with an ability to see in real time how the pay statement appearance changes based on changing settings. Illustrative embodiments thereby avoid the back and forth of sending setting selections to a payroll provider and then waiting to receive a draft version of the pay statement in order to determine whether changes need to be made. In illustrative embodiments, feedback is virtually instantaneous, allowing the user to quickly and easily modify the pay statement settings until the pay statement appearance is satisfactory to the user.

Figure 4:
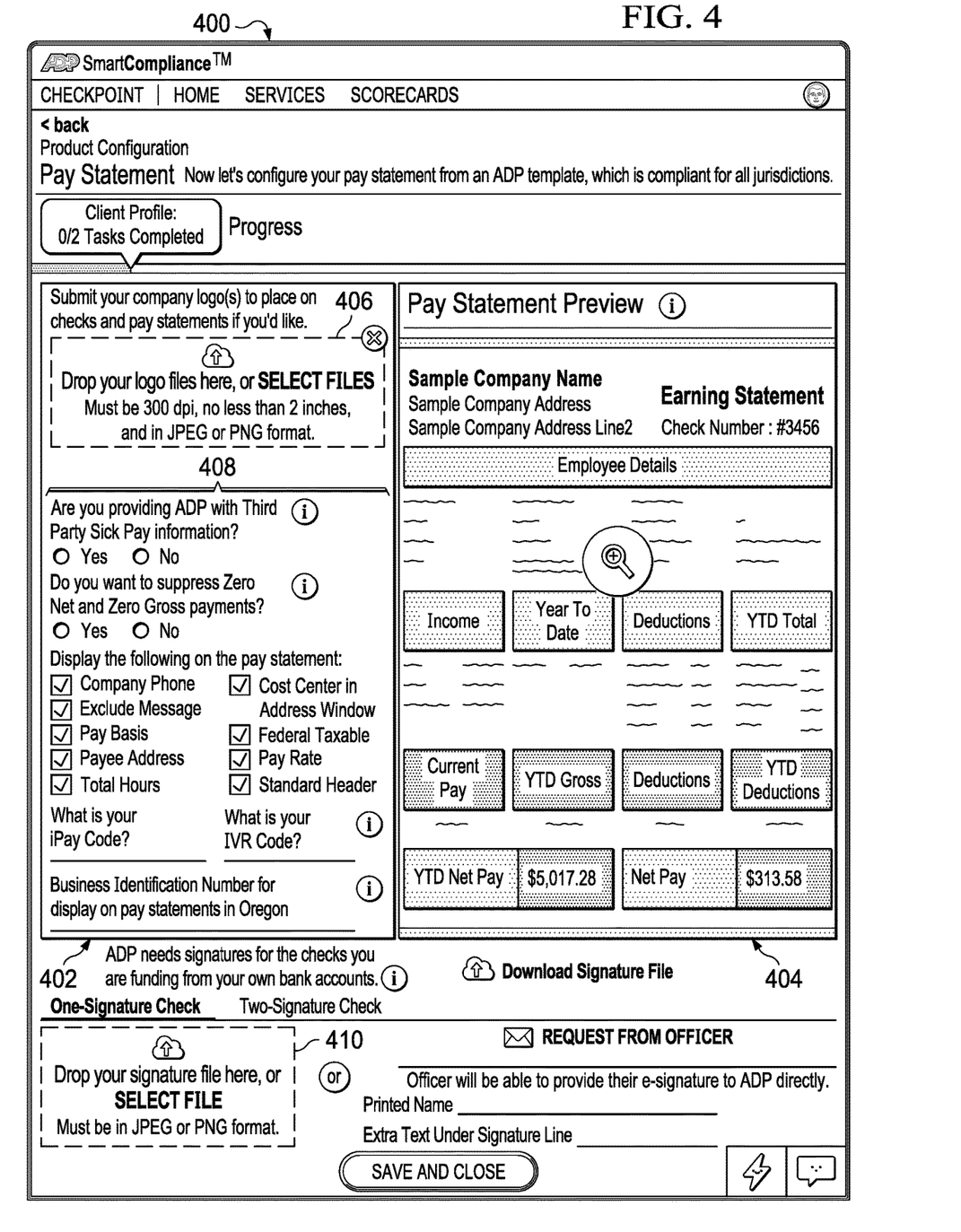
FIGS. 4-8 are screen shots of pay statement configurator interfaces in accordance with an illustrative embodiment.

FIG. 4 is a screen shot of a pay statement configurator interface 400 in accordance with an illustrative embodiment. Pay statement configurator interface 400 is an example of one implementation of pay statement interface 215 in pay statement configurator 200 in FIG. 2.

Pay statement configurator interface 400 includes an input area 402 and a preview area 404. Input area 402 includes a logo input 406 for uploading a company logo and a plurality of setting selections 408. The setting selections 408 may include check boxes, radio buttons, and text boxes for receiving user input. Input area 402 also includes a signature file input 410 where a signature file for an executive signature for display on the pay statement may be identified. Preview area 404 shows a pay statement preview based on the current selections by the user in input area 402 and includes placeholder sample data for values under the current pay column, the YTD gross column, etc.

Figure 5:
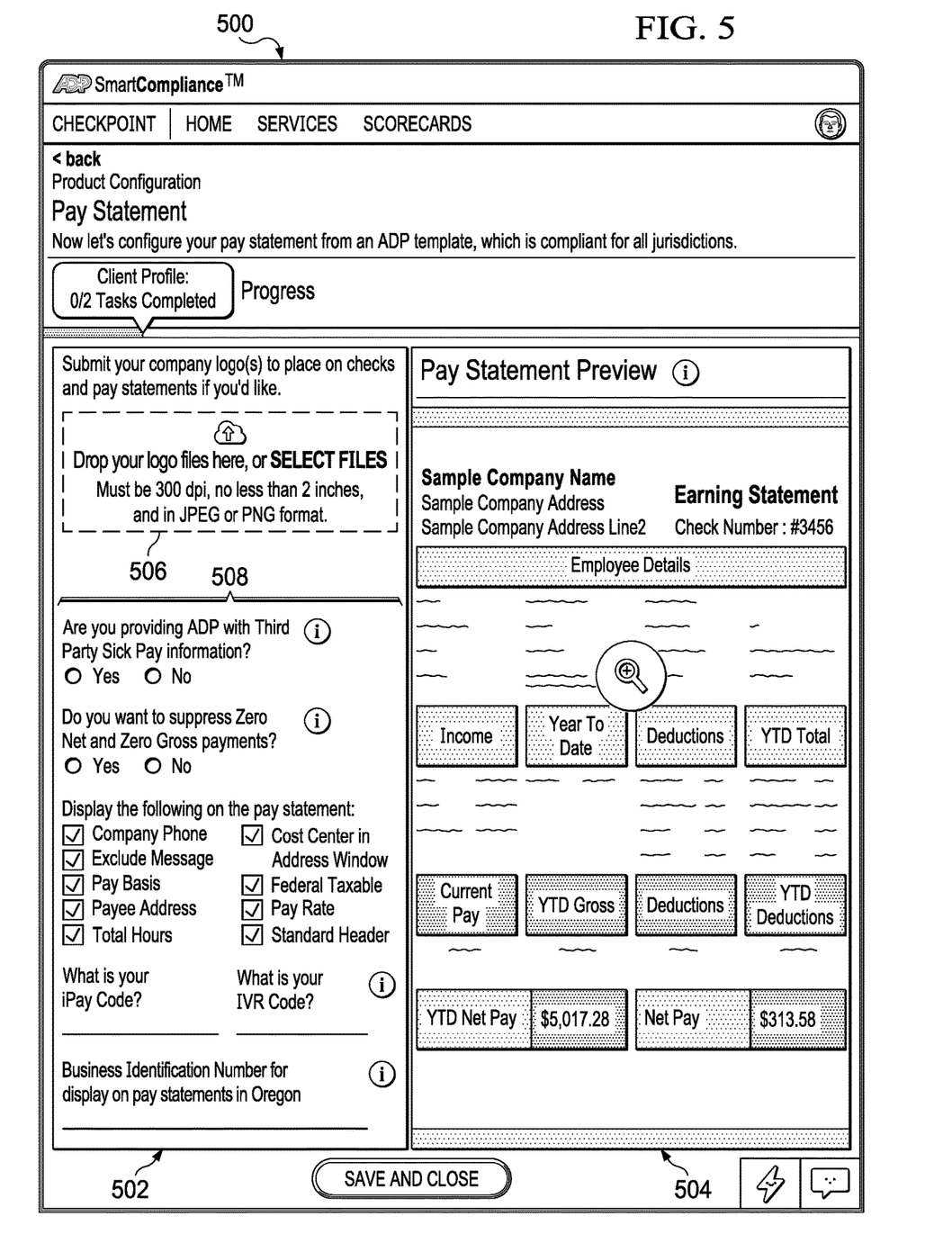

FIG. 5 is a screen shot of another version of a pay statement configurator interface 500 in accordance with an illustrative embodiment. Pay statement configurator interface 500 is an example of another implementation of pay statement interface 215 in pay statement configurator 200 in FIG. 2.

Pay statement configurator interface 500 includes an input area 502 and a preview area 504. Input area 502 includes a logo input 506 for uploading a company logo and a plurality of setting selections 508. The setting selections 508 may include check boxes, radio buttons, and text boxes for receiving user input. Preview area 504 shows a pay statement preview based on the current selections by the user in input area 502 and includes placeholder sample data for values under the current pay column, the YTD gross column, etc. Pay statement configurator interface 500 is similar to pay statement configurator interface 400 in FIG. 4, except that it is customized to not include a signature file input 410, since this client has elected to not use their own bank for funding payroll. Therefore, a signature is not needed and the input area 502 is customized accordingly such that unneeded inputs do not clutter the input area 502 and potentially confuse the user.

Figure 6:
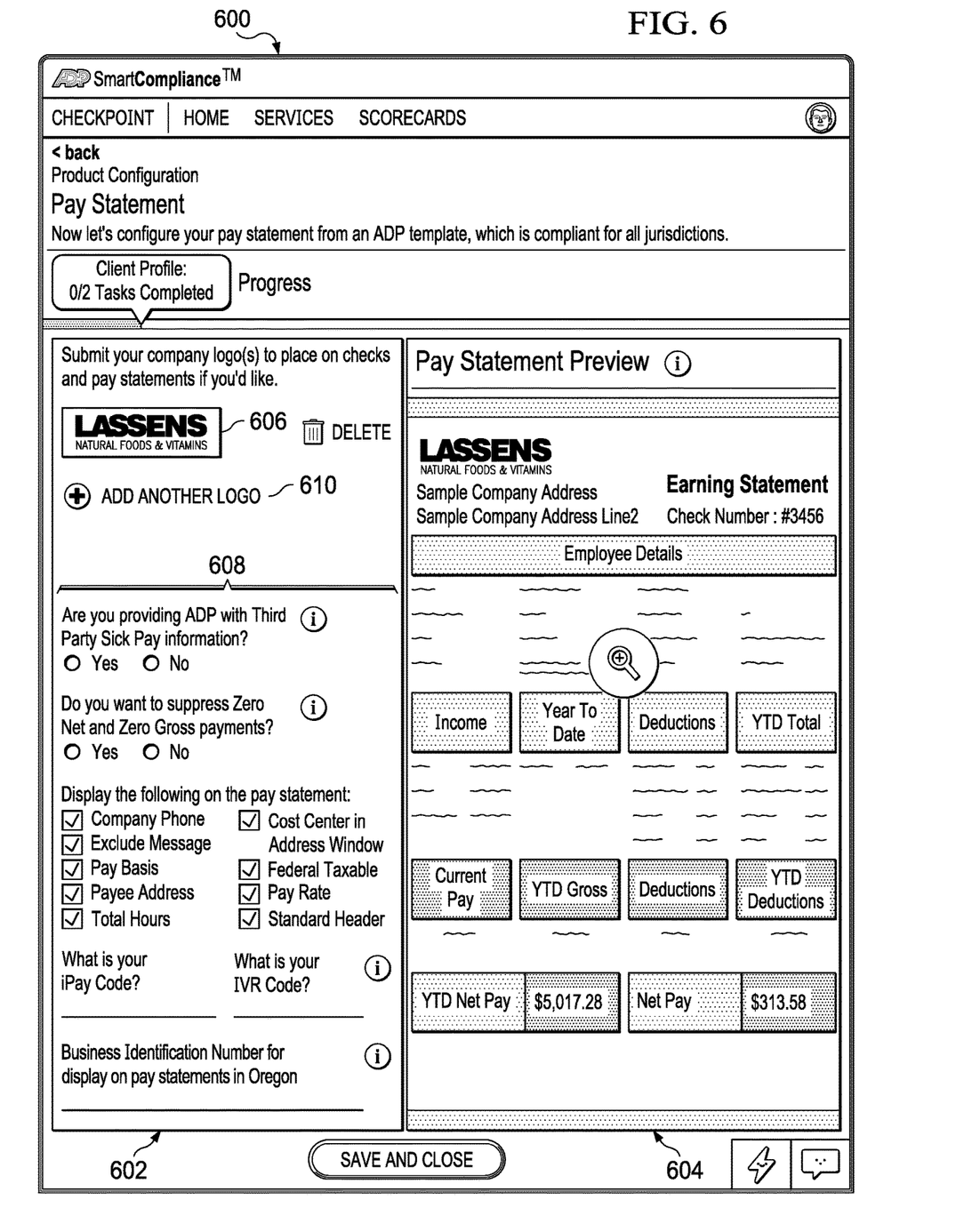

FIG. 6 is a screen shot of another version of a pay statement configurator interface 600 in accordance with an illustrative embodiment. Pay statement configurator interface 600 is an example of another implementation of pay statement interface 215 in pay statement configurator 200 in FIG. 2.

Pay statement configurator interface 600 includes an input area 602 and a preview area 604. Input area 602 includes a logo section 606 containing a company logo and a plurality of setting selections 608. The setting selections 608 may include check boxes, radio buttons, and text boxes for receiving user input. Preview area 604 shows a pay statement preview based on the current selections by the user in input area 602 and includes placeholder sample data for values under the current pay column, the YTD gross column, etc. Pay statement configurator interface 600 is similar to pay statement configurator interface 500 except that a logo has been entered into logo entry 606. This logo is also displayed in the pay statement preview area 604. Input area 602 also includes an add another logo input 610 that allows a user to upload a second logo to the system for companies that may have multiple logos, for example, for different divisions of the company.

Figure 7:
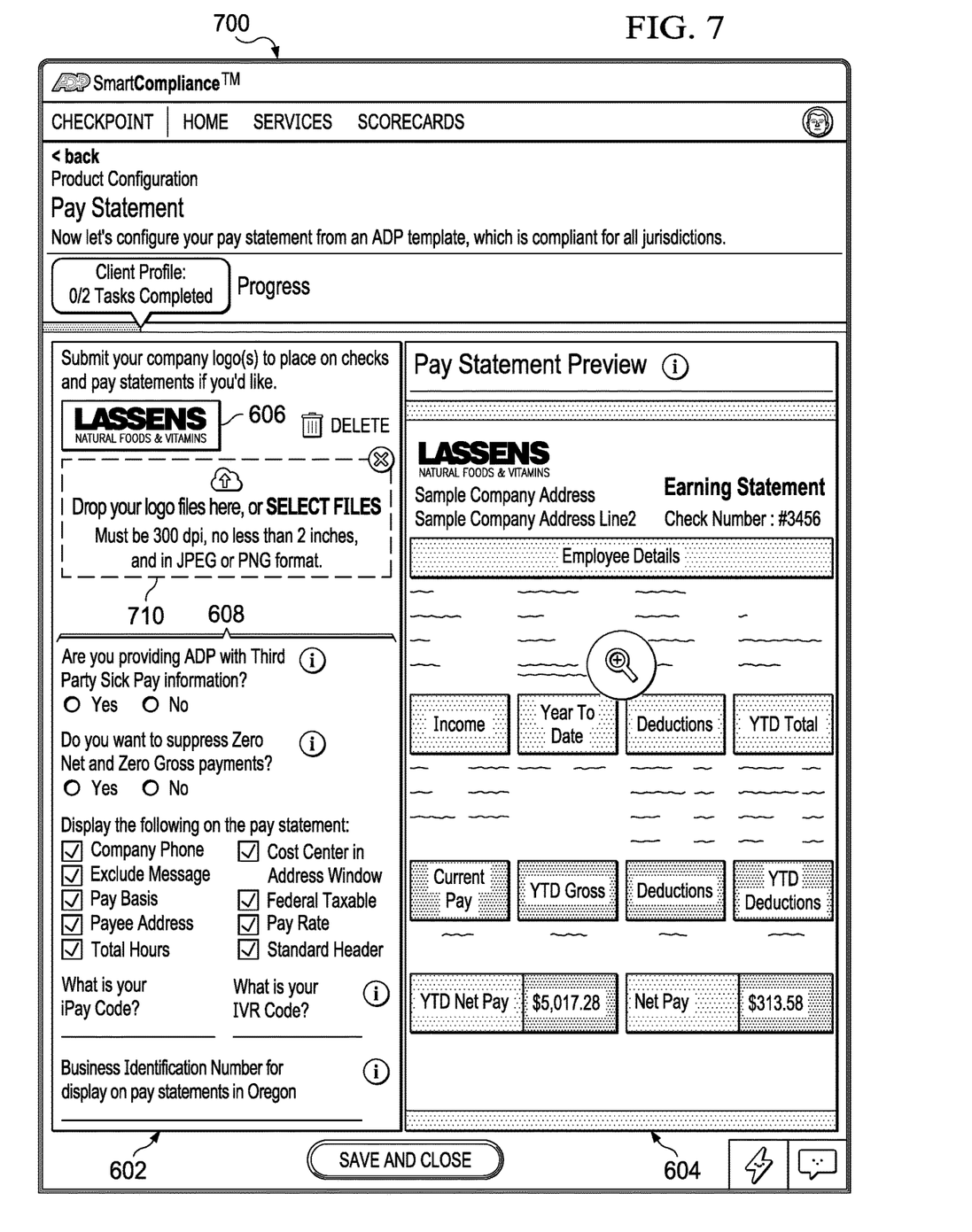

FIG. 7 is a screen shot of another version of a pay statement configurator interface 700 in accordance with an illustrative embodiment. Pay statement configurator interface 700 is similar to pay statement configurator interface 600 in FIG. 6, except that the user has selected add another logo 610 from pay statement configurator interface 600 in FIG. 6, such that a new logo input 710 for entering another logo is displayed below the previously entered logo 606.

Figure 8:
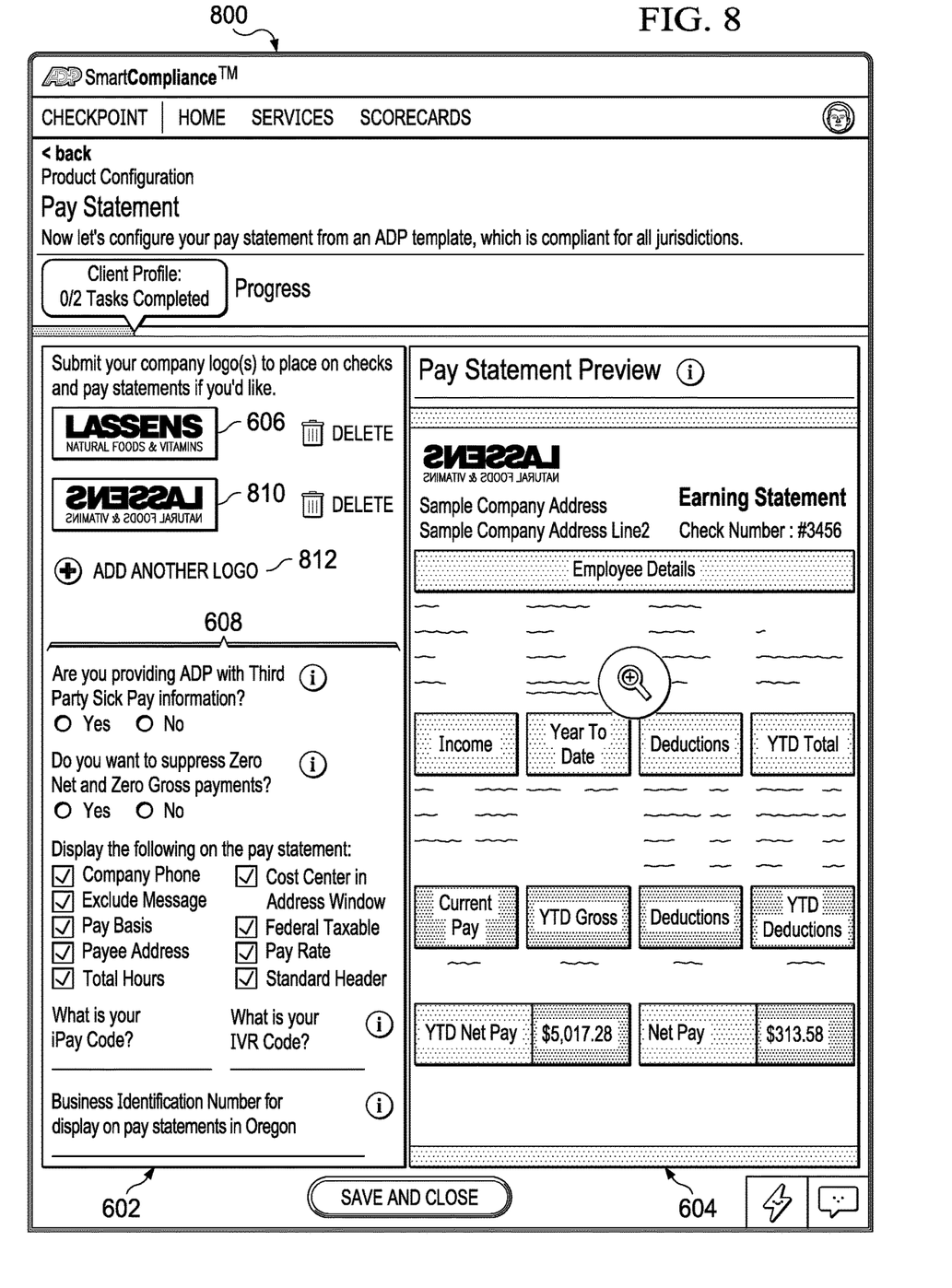

FIG. 8 is a screen shot of another version of a pay statement configurator interface 800 in accordance with an illustrative embodiment. Pay statement configurator interface 800 is similar to pay statement configurator interface 700 in FIG. 7, except that the user has selected add another logo 610 from pay statement configurator interface 600 in FIG. 6 and entered another logo in new logo input 710 in FIG. 7. The newly entered logo 810 is displayed below the previously entered logo 606. An add another logo option 812 is displayed to allow the user to add yet another logo if desired. The new logo 810 also is displayed in the pay statement preview area 604. The user can select which logo is to be used in the final version of the pay statement.

Figure 9:
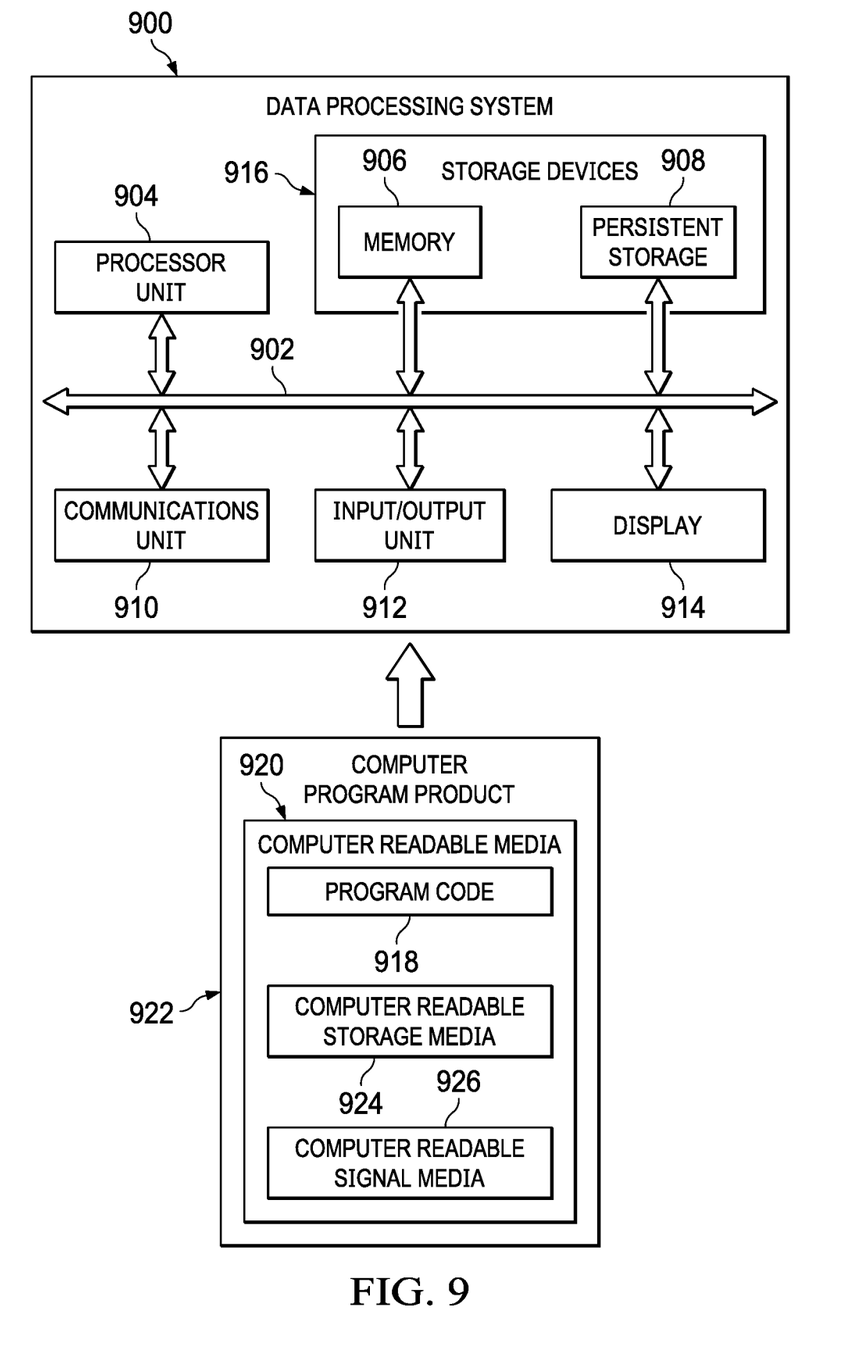
FIG. 9 is a block diagram of a data processing system in accordance with an illustrative embodiment.

Turning now to FIG. 9, an illustration of a block diagram of a data processing system is depicted in accordance with an illustrative embodiment. Data processing system 900 may be used to implement one or more computers and clients in computer system 100 in FIG. 1. Furthermore, data processing system 900 can be used to implement computer system 201 in FIG. 2.

In this illustrative example, data processing system 900 includes communications framework 902, which provides communications between processor unit 904, memory 906, persistent storage 908, communications unit 910, input/output unit 912, and display 914. In this example, communications framework 902 may take the form of a bus system.

Processor unit 904 serves to execute instructions for software that may be loaded into memory 906. Processor unit 904 may be a number of processors, a multi-processor core, or some other type of processor, depending on the particular implementation. In an embodiment, processor unit 904 comprises one or more conventional general purpose central processing units (CPUs). In an alternate embodiment, processor unit 904 comprises one or more graphical processing units (CPUs).

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 916, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908. Communications unit 910, in these illustrative examples, provides for communications with other data processing systems or devices. In these illustrative examples, communications unit 910 is a network interface card.

Input/output unit 912 allows for input and output of data with other devices that may be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs may be located in storage devices 916, which are in communication with processor unit 904 through communications framework 902. The processes of the different embodiments may be performed by processor unit 904 using computer-implemented instructions, which may be located in a memory, such as memory 906.

These instructions are referred to as program code, computer-usable program code, or computer-readable program code that may be read and executed by a processor in processor unit 904. The program code in the different embodiments may be embodied on different physical or computer-readable storage media, such as memory 906 or persistent storage 908.

Program code 918 is located in a functional form on computer-readable media 920 that is selectively removable and may be loaded onto or transferred to data processing system 900 for execution by processor unit 904. Program code 918 and computer-readable media 920 form computer program product 922 in these illustrative examples. In one example, computer-readable media 920 may be computer-readable storage media 924 or computer-readable signal media 926.

In these illustrative examples, computer-readable storage media 924 is a physical or tangible storage device used to store program code 918 rather than a medium that propagates or transmits program code 918. Alternatively, program code 918 may be transferred to data processing system 900 using computer-readable signal media 926.

Computer-readable signal media 926 may be, for example, a propagated data signal containing program code 918. For example, computer-readable signal media 926 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code 918.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for configuring a pay statement, comprising:
    determining, by a computer, an input interface version for a user based on a configuration of the user, the configuration of the user comprising i) a first configuration for a signature or ii) a second configuration for no signature, wherein the input interface version is customized to provide an input area that presents options for settings that correspond to the configuration of the user in the input area, wherein the options in the input area are automatically generated based on a type of the user, the type of the user correlated to the configuration of the user and comprising an association with a bank;
    presenting, by the computer, the input area comprising the options for the settings that correspond to the configuration of the user, in a graphical user interface for the user to enter the settings defining how the pay statement is to be configured;
    receiving, by the computer, the settings from the user, wherein the settings correspond to the configuration of the user and comprise a plurality of attributes to allow the user to define location on the pay statement at which data or type of the data is to be presented;
    generating, by the computer, a user pay statement template using the type of the user and the plurality of attributes;
    storing, by the computer, responsive to generating the user pay statement template, the user pay statement template in a user pay statement storage; and
    displaying, by the computer, in a preview area adjacent to the input area in the graphical user interface, a contemporaneous preview of the pay statement based on the user pay statement template and the settings, wherein the contemporaneous preview comprises a real time visual representation of the pay statement based on receiving the settings and example data generated to fill the user pay statement template.

2. The method of claim 1, wherein the options for the settings presented to the user in the input area do not include options for the settings that do not correspond to the configuration of the user.

3. The method of claim 1, wherein receiving the settings from the user comprises receiving a logo for an entity for which the user is configuring the pay statement.

4. The method of claim 1, wherein receiving the settings from the user comprises receiving specific pay statement attributes.

5. The method of claim 1, wherein receiving the settings from the user comprises at least one of adding or removing a line item.

6. The method of claim 1, wherein the settings allow the user to define format in which the data is to be presented on the pay statement.

7. A computer system for configuring a pay statement, the computer system comprising:
    a storage device configured to store program instructions; and
    one or more processors operably connected to the storage device and configured to execute the program instructions to cause the computer system to:
        determine an input interface version for a user based on a configuration of the user, the configuration of the user comprising i) a first configuration for a signature or ii) a second configuration for no signature, wherein the input interface version is customized to provide an input area that presents options for settings that correspond to the configuration of the user in the input area, wherein the options in the input area are automatically generated based on a type of the user, the type of the user correlated to the configuration of the user and comprising an association with a bank;
        present the input area comprising the options for the settings that correspond to the configuration of the user in a graphical user interface for the user to enter the settings defining how the pay statement is to be configured;
        receive the settings from the user, wherein the settings correspond to the configuration of the user and comprise a plurality of attributes to allow the user to define locations on the pay statement at which data or type of the data is to be presented;
        generate a user pay statement template using the type of the user and the plurality of attributes;
        store, responsive to generating the user pay statement template, the user pay statement template in a user pay statement storage; and display, in a preview area in the graphical user interface adjacent to the input area, a contemporaneous preview of the pay statement based on the user pay statement template and the settings, wherein the contemporaneous preview comprises a real time visual representation of the pay statement based on receiving the settings and example data generated to fill the user pay statement template.

8. The computer system of claim 7, wherein the options for the settings presented to the user in the input area do not include options for the settings that do not correspond to the configuration of the user.

9. The computer system of claim 7, wherein the one or more processors are configured to receive the settings from the user comprising a logo for an entity for which the user is configuring the pay statement.

10. The computer system of claim 7, wherein the one or more processors are configured to receive the settings from the user comprising specific pay statement attributes.

11. The computer system of claim 7, wherein the one or more processors are configured to receive the settings from the user comprising at least one of adding or removing a line item.

12. The computer system of claim 7, wherein the settings allow the user to define format in which the data is to be presented on the pay statement.

13. A computer program product for configuring a pay statement, the computer program product comprising a computer readable storage media having program instructions embodied therewith, the program instructions executable by a computer to cause the computer to:
  determine an input interface version for a user based on a configuration of the user, the configuration of the user comprising i) a first configuration for a signature or ii) a second configuration for no signature, wherein the input interface version is customized to provide an input area that presents options for settings that correspond to the configuration of the user in the input area, wherein the options in the input area are automatically generated based on a type of the user, the type of the user correlated to the configuration of the user and comprising an association with a bank;
  present the input area comprising the options for the settings that correspond to the configuration of the user in a graphical user interface for the user to enter the settings defining how the pay statement is to be configured;
  receive the settings from the user, wherein the settings correspond to the configuration of the user and comprise a plurality of attributes to allow the user to define locations on the pay statement at which data or type of the data is to be presented;
  generate a user pay statement template using the type of the user and the plurality of attributes;
  store, responsive to generating the user pay statement template, the user pay statement template in a user pay statement storage; and
  display, in a preview area in the graphical user interface adjacent to the input area, a contemporaneous preview of the pay statement based on the user pay statement template and the settings, wherein the contemporaneous preview comprises a real time visual representation of the pay statement based on receiving the settings and example data generated to fill the user pay statement template.

14. The computer program product of claim 13, wherein the options for the settings presented to the user in the input area do not include options for the settings that do not correspond to the configuration of the user.

15. The computer program product of claim 13, wherein the program instructions are executable by the computer to cause the computer to receive the settings from the user comprising a logo for an entity for which the user is configuring the pay statement.

16. The computer program product of claim 13, wherein the program instructions are executable by the computer to cause the computer to receive the settings from the user comprising specific pay statement attributes.

17. The computer program product of claim 13, wherein the program instructions are executable by the computer to cause the computer to receive the settings comprising at least one of adding or removing a line item.

18. The computer program product of claim 13, wherein the settings allow the user to define format in which the data is to be presented on the pay statement.

* * * * *